(12) United States Patent
Thomas et al.

(10) Patent No.: US 12,050,345 B2
(45) Date of Patent: Jul. 30, 2024

(54) WAVEGUIDE FACET INTERFACE

(71) Applicant: ROCKLEY PHOTONICS LIMITED, Altrincham (GB)

(72) Inventors: Abu Thomas, Oak Park, CA (US);
Andrea Trita, Pasadena, CA (US);
Jeffrey Driscoll, San Jose, CA (US)

(73) Assignee: Rockley Photonics Limited, Altrincham (GB)

( * ) Notice: Subject to any disclaimer, the term of this patent is extended or adjusted under 35 U.S.C. 154(b) by 22 days.

(21) Appl. No.: 17/687,068

(22) Filed: Mar. 4, 2022

(65) Prior Publication Data
US 2022/0283365 A1 Sep. 8, 2022

Related U.S. Application Data

(60) Provisional application No. 63/157,354, filed on Mar. 5, 2021.

(51) Int. Cl.
*G02B 6/125* (2006.01)
*G02B 6/122* (2006.01)
(Continued)

(52) U.S. Cl.
CPC ............ *G02B 6/125* (2013.01); *G02B 6/122* (2013.01); *G02B 6/241* (2013.01); *G02B 2006/12119* (2013.01)

(58) Field of Classification Search
CPC ................. G02B 6/125; G02B 6/241; G02B 2006/12119
See application file for complete search history.

(56) References Cited

U.S. PATENT DOCUMENTS 4,786,131 A 11/1988 Mahapatra et al.
5,212,758 A 5/1993 Adar et al.
(Continued)

FOREIGN PATENT DOCUMENTS

CN 104781708 A 7/2015
EP 0 645 649 A2 3/1995
(Continued)

OTHER PUBLICATIONS

Baets, R. et al., "Loss calculation and design of arbitrarily curved integrated-optic waveguides", Optical Society of America, Feb. 1983, pp. 177-182, vol. 73, No. 2.
(Continued)

*Primary Examiner* — Michael Stahl
(74) *Attorney, Agent, or Firm* — Lewis Roca Rothgerber Christie LLP (57) ABSTRACT

A photonic integrated circuit. In some embodiments, the photonic integrated circuit includes: a waveguide; and a waveguide facet, a first end of the waveguide being at the waveguide facet, a first angle being an angle between: the waveguide at the first end of the waveguide and the normal to the waveguide facet, the first angle being at least 5 degrees, a first section of the waveguide having a first end at the waveguide facet and a second end, the first section having: a curvature of less than 0.01/mm at the first end of the first section, a curvature of less than 0.01/mm at the second end of the first section, and a curvature of at least 0.1/mm at a point between the first end and the second end.

19 Claims, 3 Drawing Sheets

(51) Int. Cl.
*G02B 6/24* (2006.01)
*G02B 6/12* (2006.01)

(56) References Cited

U.S. PATENT DOCUMENTS

| | | | |
|---|---|---|---|
| 5,838,844 A | 11/1998 | Van Dam et al. | |
| 5,978,400 A * | 11/1999 | Campbell | H01S 5/10 372/102 |
| 6,212,323 B1 | 4/2001 | Harpin et al. | |
| 6,411,763 B1 * | 6/2002 | Sillard | H01S 5/0265 385/129 |
| 6,516,120 B2 | 2/2003 | Roberts et al. | |
| 8,045,834 B2 | 10/2011 | Painter et al. | |
| 8,094,987 B2 | 1/2012 | Armani | |
| 8,620,120 B2 | 12/2013 | Baets et al. | |
| 9,075,251 B2 | 7/2015 | Dwivedi et al. | |
| 9,606,293 B2 | 3/2017 | Ma | |
| 9,690,045 B2 | 6/2017 | Goodwill et al. | |
| 9,696,478 B2 | 7/2017 | Bogaerts | |
| 9,778,417 B2 | 10/2017 | Cherchi et al. | |
| 10,838,146 B2 | 11/2020 | Trita | |
| 2004/0126063 A1 * | 7/2004 | Alphonse | G02B 6/1228 385/14 |
| 2006/0034576 A1 * | 2/2006 | Merritt | G02B 6/12004 385/129 |
| 2009/0285542 A1 | 11/2009 | Armani et al. | |
| 2010/0158443 A1 * | 6/2010 | Jeong | G02B 6/14 29/829 |
| 2010/0215072 A1 | 8/2010 | Funabashi | |
| 2011/0116735 A1 | 5/2011 | Baets et al. | |
| 2011/0138860 A1 | 6/2011 | Armani | |
| 2011/0292496 A1 * | 12/2011 | Mohrdiek | G02B 6/30 359/341.1 |
| 2014/0055842 A1 * | 2/2014 | Kiyota | H01S 5/101 359/341.1 |
| 2014/0161384 A1 | 6/2014 | Dwivedi et al. | |
| 2015/0260916 A1 | 9/2015 | Cherchi et al. | |
| 2015/0277042 A1 | 10/2015 | Goodwill et al. | |
| 2016/0025931 A1 | 1/2016 | Bogaerts | |
| 2016/0109733 A1 * | 4/2016 | Porte | G02F 1/0316 385/3 |
| 2017/0071510 A1 | 3/2017 | Delbeke et al. | |
| 2017/0192171 A1 | 7/2017 | Shi et al. | |
| 2017/0205578 A1 | 7/2017 | Van Thourhout et al. | |
| 2017/0299902 A1 | 10/2017 | Yu et al. | |
| 2017/0351025 A1 | 12/2017 | Trita | |
| 2021/0311333 A1 * | 10/2021 | Thomas | H01S 5/026 |

FOREIGN PATENT DOCUMENTS

| | | |
|---|---|---|
| EP | 1 464 997 A1 | 10/2004 |
| GB | 2 378 260 A | 2/2003 |
| JP | 11-64654 A | 3/1999 |
| JP | 2006-78570 A | 3/2006 |
| JP | 2006-091679 A | 4/2006 |
| JP | 2011155103 A | 8/2011 |
| WO | WO 02/14915 A2 | 2/2002 |
| WO | WO 02/14918 A1 | 2/2002 |
| WO | WO 03/048826 A2 | 6/2003 |
| WO | WO 2014/060648 A1 | 4/2014 |
| WO | WO 2018/146221 A1 | 8/2018 |

OTHER PUBLICATIONS

Bauters, J. F. et al., "Ultra-low-loss high-aspect-ratio $Si_3N_4$ waveguides", Optics Express, Feb. 3, 2011, pp. 3163-3174, vol. 19, No. 4, Optical Society of America.

Berlatzky, Y. et al., "Controlling Coupling of Guided to Radiating Modes Using Adiabatic Transitions Between Waveguides of Different Curvature", Journal of Lightwave Technology, Mar. 2005, pp. 1278-1283, vol. 23, No. 3, IEEE.

Bogaerts, W. et al., "Compact Single-Mode Silicon Hybrid Rib/Strip Waveguide With Adiabatic Bends", IEEE Photonics Journal, Jun. 2011, 13 pages, vol. 3, No. 3, IEEE.

Charles, N. et al., "Design of Optically Path Length Matched, Three-Dimensional Photonic Circuits Comprising Uniquely Routed Waveguides", Appl. Opt., 2012, pp. 1-11.

Charles, N. et al., "Techniques for Designing Physically Path-Length Matched Optical Circuitry", IQEC/CLEO Pacific Rim 2011, Aug. 28, 2011 through Sep. 1, 2011, Sydney, Australia, pp. 73-75, AOS.

Cherchi, M. et al., "Dramatic size reduction of waveguide bends on a micron-scale silicon photonic platform", Optics Express, Jul. 29, 2013, pp. 17814-17823, vol. 21, No. 15, Optical Society of America.

Chinese Notification of the First Office Action, for Patent Application No. CN201780034439.8, mailed Apr. 26, 2020, 10 pages.

Feng, D. et al., "Compact single-chip VMUX/DEMUX on the silicon-on-insulator platform", Optics Express, Mar. 28, 2011, pp. 6125-6130, vol. 19, No. 7, Optical Society of America.

International Search Report and Written Opinion of the International Searching Authority, Mailed Oct. 16, 2017, Corresponding to PCT/GB2017/051470, 25 pages.

Invitation to Pay Additional Fees and Partial Search Report mailed Aug. 21, 2017, Corresponding to International Application No. PCT/GB2017/051470; 17 pages.

Ismail, N. et al., "Improved arrayed-waveguide-grating layout avoiding systematic phase errors", Optics Express, Apr. 20, 2011, pp. 8781-8794, vol. 19, No. 9, Optical Society of America.

Kim, W.-C. et al., "Investigation of 18-channel CWDM arrayed waveguide grating with silica-based waveguide", Optical Engineering, Aug. 24, 2016, pp. 087110-1 through 087110-6, vol. 55, No. 8, SPIE.

Koos, C. et al., "Ideal Bend Contour Trajectories for Single-Mode Operation of Low-Loss Overmoded Waveguides", IEEE Photonics Technology Letters, Jun. 1, 2007, vol. 19, No. 11, pp. 819-821, IEEE.

Muneeb, M. et al., "Silicon-on-insulator shortwave infrared wavelength meter with integrated photodiodes for on-chip laser monitoring", Optics Express, Oct. 27, 2014, pp. 27300-27308, vol. 22, No. 22, Optical Society of America.

Mustieles, F. J. et al., "Theoretical S-Bend Profile for Optimization of Optical Waveguide Radiation Losses", IEEE Photonics Technology Letters, May 1993, pp. 551-553, vol. 5, No. 5, IEEE.

O'Brien, J. F., "CS 294-13 Advanced Computer Graphics Subdivision Basics", University of California, Natural Splines, Nov. 12, 2009, 34 pages, available at: https://inst.eecs.berkeley.edu/~cs294-13/fa09/lectures/294-lecture17.pdf.

Okamoto, K., "Wavelength-Division-Multiplexing Devices in Thin SOI: Advances and Prospects", IEEE Journal of Selected Topics in Quantum Electronics, Jan. 10, 2014, 10 pages, vol. 20, No. 4, IEEE.

Partial English translation of Chinese Notification of the First Office Action, for Patent Application No. CN201780034439.8, mailed Apr. 26, 2020, 8 pages.

Pathak, S. et al., "Comparison of AWGs and Echelle Gratings for Wavelength Division Multiplexing on Silicon-on-Insulator", IEEE Photonics Journal, Oct. 15, 2014, 10 pages, vol. 6, No. 5, IEEE.

Pathak, S., "Silicon Nano-Photonics Based Arrayed Waveguide Gratings", IMEC, Mar. 2014, 75 pages.

Rickman, A., "The commercialization of silicon photonics", Nature Photonics, Aug. 2014, pp. 579-582, vol. 8, Macmillan Publishers Limited.

Sheehan, R. N. et al., "The design of low-loss curved waveguides", Optical and Quantum Electronics, Aug. 21, 2009, pp. 1211-1218, vol. 40, Springer Science+Business Media, LLC.

Sheng, K. J., "Design, Fabrication and Experimental Characterization of a PDMS-Based AWG Spectrometer", Thesis submitted to the Nanyang Technological University in fulfillment of the requirement for the degree of Doctor of Philosophy, 2011, 183 pages.

Soref, R. A. et al., "Large Single-Mode Rib Waveguides in GeSi—Si and Si-on-$SiO_2$", IEEE Journal of Quantum Electronics, Aug. 1991, pp. 1971-1974, vol. 27, No. 8, IEEE.

Takahashi, H. et al., "Wavelength Multiplexer Based on $SiO_2$—$Ta_2O_5$ Arrayed-Waveguide Grating", Journal of Lightwave Technology, pp. 989-995, Jun. 1994, vol. 12, No. 6, IEEE.

(56) References Cited

OTHER PUBLICATIONS

Trita, A. et al., "Miniaturized Fiber Bragg Grating Interrogator based on an Arrayed Waveguide Grating in SOI platform", Frontiers in Optics/Laser Science, paper FTh3E.6, 2015, 2 pages, Optical Society of America.
Tu, X. et al., "Compact low-loss adiabatic bends in silicon shallow-etched waveguides", 2016 IEEE 13$^{th}$ International Conference on Group IV Photonics (GFP), Shanghai, 2016, pp. 48-49, IEEE.
U.K. Intellectual Property Office Examination Report, Dated Aug. 30, 2018, for Patent Application No. GB1812302.6, 2 pages.
U.K. Intellectual Property Office Examination Report, dated Aug. 13, 2020, for Patent Application No. GB 1812302.6, 2 pages.
U.K. Intellectual Property Office Examination Report, Dated Feb. 15, 2019, for Patent Application No. GB1812302.6, 7 pages.
U.K. Intellectual Property Office Examination Report, dated Feb. 12, 2020, for Patent Application No. GB1812302.6, 4 pages.
U.S. Advisory Action from U.S. Appl. No. 15/489,669, dated Dec. 16, 2019, 10 pages.
U.S. Examiner Interview Summary from U.S. Appl. No. 15/489,669, dated May 24, 2018, 4 pages.
U.S. Corrected to Notice of References Cited from U.S. Appl. No. 15/489,669, dated Oct. 22, 2020, 3 pages.
U.S. Office Action from U.S. Appl. No. 15/489,669, dated Jan. 11, 2018, 14 pages.
U.S. Office Action from U.S. Appl. No. 15/489,669, dated Aug. 7, 2018, 16 pages.
U.S. Office Action from U.S. Appl. No. 15/489,669, dated Jan. 7, 2019, 18 pages.
U.S. Office Action from U.S. Appl. No. 15/489,669, dated Jul. 26, 2019, 19 pages.
U.S. Office Action from U.S. Appl. No. 15/489,669, dated Oct. 6, 2017, 7 pages.
Watts, M. R., "Adiabatic microring resonators", Optics Letters, Oct. 1, 2010, pp. 3231-3233, vol. 35, No. 19, Optical Society of America.
Zhou, X. et al., "Application of Physical Spline Finite Element Method (PSFEM) to Fullwave Analysis of Waveguides", Progress In Electromagnetics Research, 2006, pp. 19-41, vol. 60, Arizona State University, available at: http://www.jpier.org/PIER/pier.php?paper=0508112.
Bahadori, M. et al., "Universal Design of Waveguide Bends in Silicon-on-Insulator Photonics Platform", Journal of Lightwave Technology, Jul. 1, 2019, pp. 3044-3054, vol. 37, No. 13, IEEE.
International Search Report and Written Opinion of the International Searching Authority, Mailed May 23, 2022, Corresponding to PCT/EP2022/055486, 16 pages.
Vogelbacher, F. et al., "Analysis of silicon nitride partial Euler waveguide bends", Oct. 16, 2019, 13 pages, arXiv:1910.07257v1, Optical Society of America.
Pathak, Shibnath, "Silicon Nano-Photonics Based Arrayed Waveguide Gratings", University of Gwent, Jan. 2014, 234 pages.

\* cited by examiner

WAVEGUIDE FACET INTERFACE

CROSS-REFERENCE TO RELATED APPLICATION(S)

The present application claims priority to and the benefit of U.S. Provisional Application No. 63/157,354, filed Mar. 5, 2021, entitled "WAVEGUIDE FACET INTERFACE", the entire content of which is incorporated herein by reference.

FIELD

One or more aspects of embodiments according to the present disclosure relate to photonic integrated circuits, and more particularly to a waveguide facet interface in a photonic integrated circuit.

BACKGROUND

In a photonic integrated circuit, it may be advantageous for a waveguide on the photonic integrated circuit to be configured so that light couples, at an edge of the photonic integrated circuit, e.g., into or from a fiber, or into or from waveguides on an adjacent photonic integrated circuit. In such a situation, it may be advantageous for the waveguide facet on the photonic integrated circuit to be oblique to the waveguide and to the edge of the photonic integrated circuit, and for the waveguide to be curved.

It is with respect to this general technical environment that aspects of the present disclosure are related.

SUMMARY

According to an embodiment of the present disclosure, there is provided a photonic integrated circuit, including: a waveguide; and a waveguide facet, a first end of the waveguide being at the waveguide facet, a first angle being an angle between: the waveguide at the first end of the waveguide, and the normal to the waveguide facet, the first angle being at least 5 degrees, a first section of the waveguide having a first end at the waveguide facet and a second end, the first section having: a curvature of less than 0.01/mm at the first end of the first section, a curvature of less than 0.01/mm at the second end of the first section, and a curvature of at least 0.1/mm at a point between the first end and the second end.

In some embodiments, the maximum value of the magnitude of the rate of change of curvature within the first section is less than 15/mm$^2$.

In some embodiments, the photonic integrated circuit further includes a dicing edge, wherein a second angle is an angle between the waveguide facet and the dicing edge, the second angle being greater than 20 degrees.

In some embodiments, wherein the second angle is within 2 degrees of the inverse sine of 3.5 times the sine of the first angle.

In some embodiments, the first angle is less than 13 degrees.

In some embodiments, the length of the first section is less than 4 mm.

In some embodiments, the first section has a curvature of at least 0.2/mm at a point between the first end and the second end.

In some embodiments, the first section attenuates a fundamental transverse mode by less than 0.1 dB.

In some embodiments, the first section attenuates a higher order transverse mode by at least 3 dB.

In some embodiments, the photonic integrated circuit includes a doped region on one side of the first section.

In some embodiments, the length of the first section is less than 2 mm.

In some embodiments, the first section has a curvature of at least 0.3/mm at a point between the first end and the second end.

In some embodiments, the first section attenuates a fundamental transverse mode by less than 0.1 dB.

In some embodiments: the first section includes: a second section of waveguide having a first end and a second end, and a third section of waveguide, having a first end abutting against the second end of the second section, and a second end; the curvature at the second end of the second section of waveguide is at least 0.1/mm; and the curvature at the first end of the third section of waveguide is at least 0.1/mm.

In some embodiments, the rate of change of curvature is, everywhere within the second section, within 20% of a constant.

In some embodiments, the rate of change of curvature is, everywhere within the third section, within 20% of a constant.

In some embodiments, each point of a centerline of the second section is within 5 microns of a curve defined by a set of points, each point having, for a value of a parameter L: an x coordinate equal to a product of a constant of proportionality and the integral, over a first variable of integration ranging from zero to L, of the cosine of the square of the first variable of integration, and a y coordinate equal to a product of the constant of proportionality and the integral, over a second variable of integration ranging from zero to L, of the sine of the square of the second variable of integration.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a waveguide facet interface provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a photonic integrated circuit (PIC) (e.g., in a silicon PIC), waveguides may be used to confine and guide light propagating in the PIC. In some circumstances, it may be advantageous to couple such a waveguide to a transmitter or receiver of light that is not integrated into the PIC. For example, a modulator chip (e.g., a modulator chip composed of a III-V semiconductor) may be bonded to a silicon PIC and light may be coupled between waveguides on the silicon PIC and a waveguide on the modulator chip. Light may be coupled from a first waveguide on the silicon PIC to a second waveguide, on the modulator chip, and the light may propagate through a modulator on the modulator chip, and then be coupled to a third waveguide, on the silicon PIC. Light may be coupled out of and into waveguides (e.g., the first and third waveguides) on the silicon PIC through facet interfaces, e.g., as described herein for some embodiments.

Figure 1:
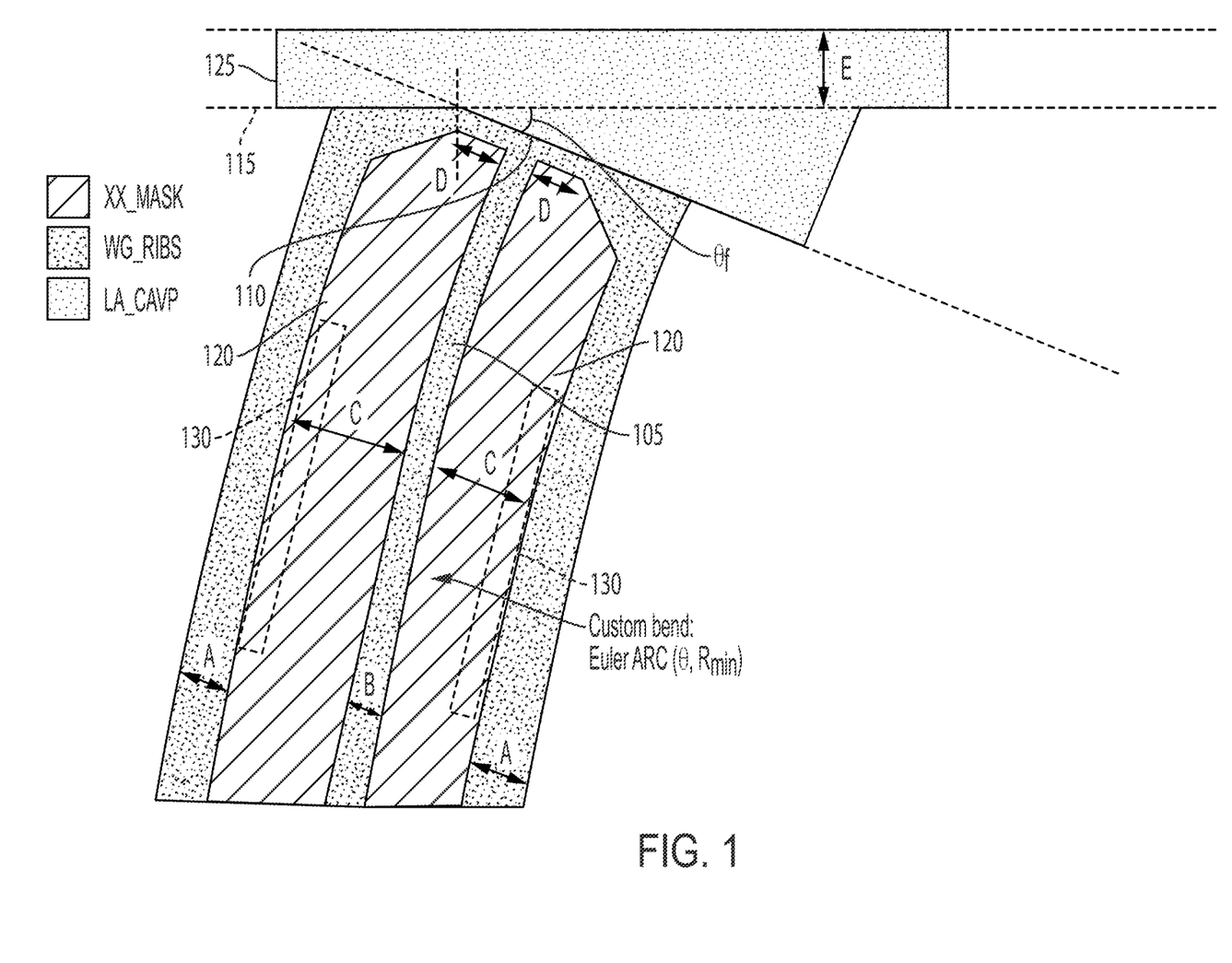
FIG. 1 is a top view of an end of a waveguide at an edge of a photonic integrated circuit, according to an embodiment of the present disclosure.

FIG. 1 shows a portion of a waveguide facet interface, in some embodiments. A waveguide 105 has a first end at a facet 110, which is formed (e.g., by etching) at an angle $\theta_F$ relative to a dicing edge 115 of the PIC (the dicing edge 115 being, e.g., an edge formed when the PIC chip is diced from a wafer). The waveguide may be a rib waveguide 105, fabricated on a silicon on insulator (SOI) wafer. The silicon on insulator wafer may include a substrate, an oxide layer (or buried oxide, or "BOX" layer), on the substrate, and a device layer (e.g., a 3-micron thick device layer) of silicon (e.g., of crystalline silicon) on the BOX layer. The rib waveguide 105 may be between two slabs 120 having a height of 1.8 microns (above the BOX layer) (e.g., a thickness of 1.8 microns). The rib waveguide 105 may have a width of about 2.6 microns (e.g., a width between 1.5 microns and 4 microns) and it may extend about 1.2 microns above the slabs (so that the total height of the rib 105 may be the same as the (3-micron) thickness of the device layer). In the terminology used herein, the "waveguide" is the rib, and the slabs are not considered part of the "waveguide", although a significant fraction of the optical power may propagate within the slab. The rib waveguide may be formed by masking the rib and etching a trench on each side of the rib, the trench having a depth of about 1.2 microns. The remainder of the device layer at the bottom of the trenches (e.g., the remaining 1.8 microns of device layer) may form the slabs 120.

As shown in FIG. 1, the trenches forming the slabs 120 may have a width C (e.g., 10 microns). For greater mechanical strength, the trenches may not extend to the dicing edge 115 nor to the facet 110. Accordingly, the trenches may taper down to a narrower width D at the facet, on one side to avoid the dicing edge 115, and on the other side to preserve the symmetry of the waveguide structure. In operation, light may propagate out of the waveguide 105, across the gap 125 (the gap 125 having a width E) and into a corresponding waveguide (e.g., on another chip) on the other side of the gap 125 (or light may propagate in the opposite direction, from the corresponding waveguide into the waveguide 105 of the PIC). In some embodiments, light from the waveguide may instead be transmitted into (or received from) (i) free space, or, (across a gap) (ii) an optical fiber. The dimension B may have a value between 2 microns and 5 microns, the dimension C may have a value between 3 microns and 10 microns, and the dimension D may have a value between 2 microns and 5 microns.

Figure 2:
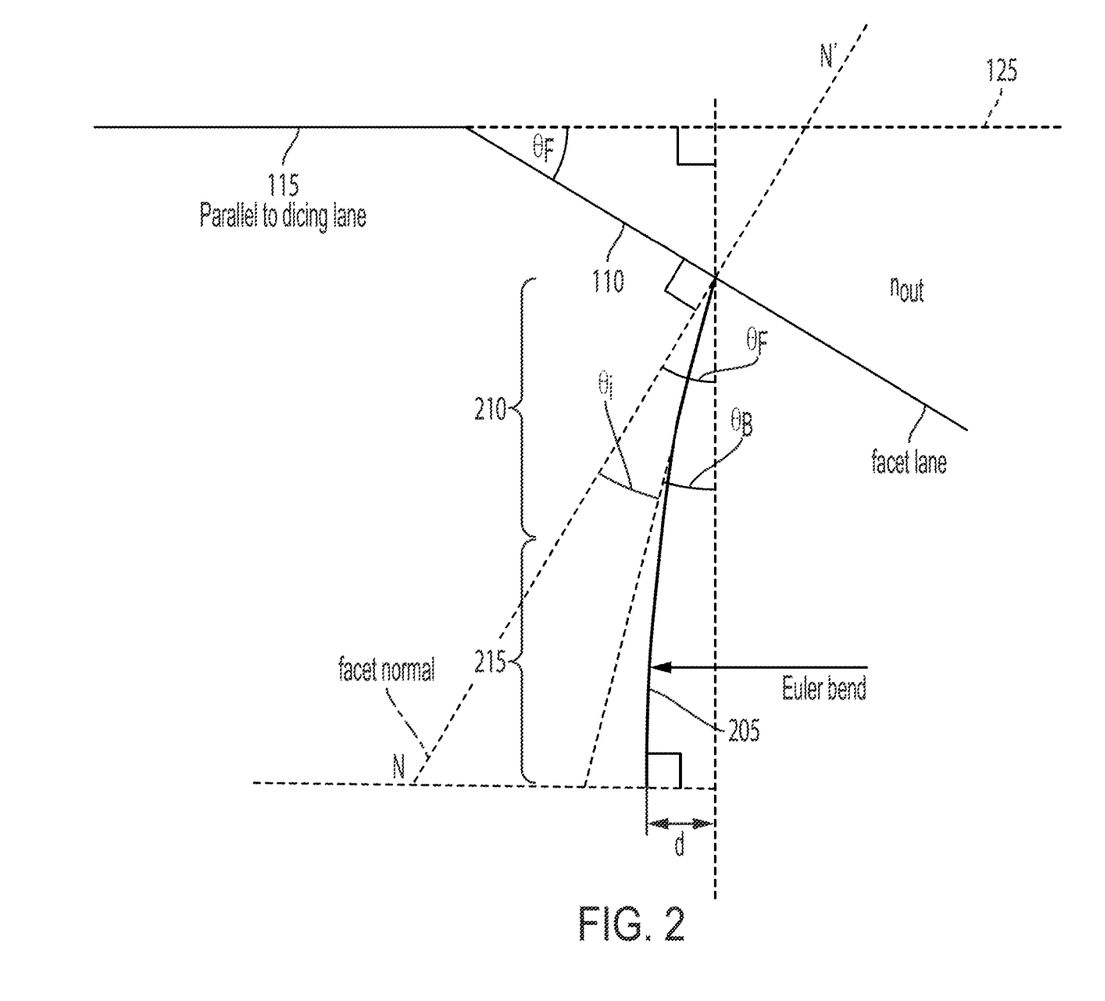
FIG. 2 is a schematic drawing of the waveguide facet interface, according to an embodiment of the present disclosure.

FIG. 2 is a schematic drawing of the waveguide facet interface. As in FIG. 1, the facet 110 is oblique to the dicing edge 115, and the first end of the waveguide 105 is oblique to the facet 110. The angle $\theta_i$ between the waveguide 105 and the normal to the waveguide facet 110 may be selected to be sufficiently large to significantly reduce back-reflections from the facet, e.g., it may be between 6 and 12 degrees. The angle $\theta_F$ of the facet may be selected such that light launched into the gap 125 propagates across the gap in a direction substantially perpendicular to (e.g., within 2 degrees of perpendicular to) the dicing edge 115. The angles $\theta_F$ and $\theta_i$ may be related by Snell's law, as follows (when the material outside the facet is air or vacuum):

$$\sin(\theta F) = n \sin(\theta_i)$$

where n is the index of refraction of the waveguide material (e.g., crystalline silicon) at the wavelength of operation of the PIC (and the index of refraction in the gap 125 is taken to be 1); in some embodiments, n is equal to 3.5. This equation may be solved to determine that $\theta_F$ is the inverse sine of 3.5 times the sine of the first angle $\theta_i$. A similar equation ($n_o \sin(\theta F) = n_i \sin(\theta_i)$) may be employed if the material outside the facet is, e.g., index matching gel (in which case $n_o$ is the index of refraction of the material outside the facet, and $n_i$ is the index of refraction of the material inside the facet (i.e., in the waveguide)).

The first end of the waveguide is also oblique to the dicing edge 115. For efficient use of chip area on the PIC, it may be advantageous for the waveguides on the PIC to be parallel or perpendicular to the dicing edge 115 wherever possible on the PIC. As such, it may be advantageous for a first section of waveguide 205, which extends to the facet 110, to include a bend in which the direction of propagation changes, so that at the second end of the first section of waveguide 205 it is perpendicular to the dicing edge 115. The angle change $\theta_B$ within the first section of waveguide 205 may be calculated as the difference $\theta_F - \theta_i$, as may be seen from FIG. 2. Although a circular arc may be used to achieve this change in direction, the use of a circular arc may have significant disadvantages, such as the introduction of significant loss and coupling into higher order modes at the transition between the circular arc and a straight waveguide that may be connected to it.

As such, the first section of waveguide 205 (which may have a first end and a second end, the first end being the end at the facet 110) may have a curvature that (i) varies continuously along the length of the first section of waveguide 205, and that (ii) is substantially zero (i.e., the first section of waveguide 205 is substantially straight), at the second end of the first section of waveguide 205 (at which it may abut against a straight section of waveguide that is perpendicular to the dicing edge 115). The first section of waveguide 205 may consist of two sections: (i) a second section of waveguide 210 having a first end at the facet, and (ii) a third section of waveguide 215 having a first end and a second end, the first end abutting against a second end of the second section 210. Within each of the second section 210 and the third section 215, the curvature may change continuously. At the second end of the first section of waveguide 205 (i.e., at the second end of the third section of waveguide 215) the waveguide may be perpendicular to the dicing edge 115 and it may be substantially straight (e.g., it may have a curvature of less than 0.01/mm). In some embodiments the first section of waveguide 205 is (in addition to being substantially straight at the second end, as mentioned above), substantially straight at the first end. This may improve the coupling into a waveguide (which may also be straight at the corresponding facet) on the other side of the gap 125.

Figure 3:
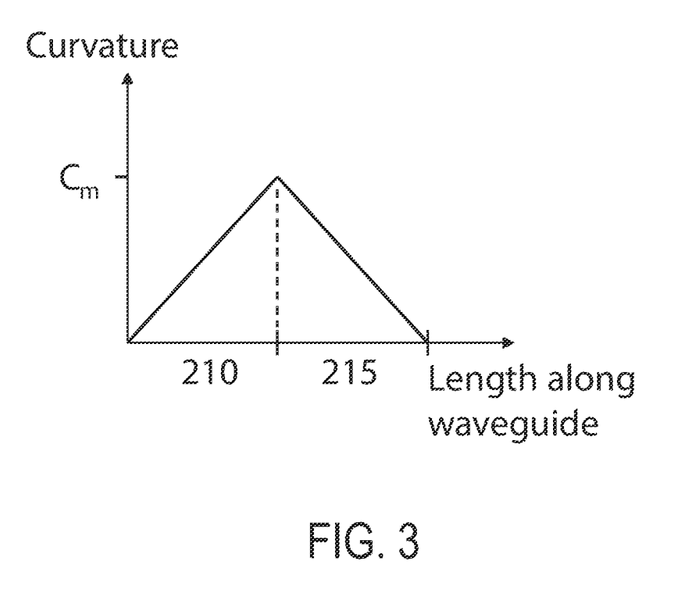
FIG. 3 is a graph of curvature as a function of distance along a waveguide, according to an embodiment of the present disclosure.

In some embodiments, the curvature of the waveguide increases at a constant rate, along a direction away from the facet 110 within the second section of waveguide 210, reaching a maximum value of curvature, $C_m$, at the end of the second section of waveguide 210, and then decreases again in the third section of waveguide 215, to zero, at a constant rate (e.g., at a negative constant rate having the same magnitude as the rate of increase within the second section of waveguide 210). The curvature as a function of wavelength along the length of the waveguide, in such an embodiment, is shown in FIG. 3. The angle of the total direction change within the waveguide may be approximately given by the product of the length of the waveguide and the mean curvature, $C_m/2$. For example, for a minimum radius of curvature of 5 mm (a maximum curvature of 0.2/mm), and a length of 2 mm, the angle change may be about 0.2 radians, i.e., about 11.5 degrees. Such a waveguide may have a lateral extent d (as shown in FIG. 2) of about 400 microns. An alternate waveguide shape having a minimum radius curvature of 3 mm (a maximum curvature of about 0.33/mm) may achieve the same angle change over a length of about 1.2 mm.

In some embodiments, the rate of change of curvature may not be precisely constant, but may instead vary slightly, so that it is, e.g., within 20% of a constant (or within a fraction, between 1% and 50%, of a constant) within the second section of waveguide 210 (or within a portion of the second section of waveguide 210 excluding a short section at the second end, at which the rate of curvature may change abruptly to have the opposite sign). Similarly, the rate of change of curvature may be, e.g., within 20% of a constant (or within a fraction, between 1% and 50%, of a constant) within, or within most of (e.g., within 80% of) the third section of waveguide 215.

In some embodiments the shape of the waveguide (e.g., of the centerline of the waveguide) of the second section of waveguide 210 or of the third section of waveguide 215 may be calculated using the following integrals:

$$x = \frac{1}{a}\int_0^L \cos(s^2)ds$$

$$y = \frac{1}{a}\int_0^L \sin(s^2)ds$$

A curve that has (x, y) coordinates given by these two integrals (i.e., (i) an x coordinate equal to a product of a constant of proportionality and the integral, over a first variable of integration (s) ranging from zero to L, of the cosine of the square of the first variable of integration, and (ii) a y coordinate equal to a product of the constant of proportionality and the integral, over a second variable of integration (s) ranging from zero to L, of the sine of the square of the second variable of integration) may be referred to as a "clothoid" curve. A curve having a curvature that varies linearly with length along the curve (as is the case, in some embodiments, for the second section of waveguide 210 and for the third section of waveguide 215) may be referred to as an "Euler" bend or as an "Euler spiral". The Euler bends may be a subset of the clothoid curves. In some embodiments the centerline of the waveguide section may not precisely follow the curve defined by the (x, y) coordinates defined above but it may instead be the case that every point of the centerline is within a certain distance (e.g., within 1 micron or within 5 microns, or within some other distance between 0.1 microns and 10.0 microns) of the curve.

Waveguides in the PIC may be capable of confining a plurality of different transverse modes (each in two different polarization states), including a fundamental mode, and a plurality of higher order modes. In some circumstances the presence of higher order modes may degrade the performance of the PIC; for example, interference between a higher order mode and the fundamental mode may alter the behavior of the PIC, causing a reduction in performance. As such, it may be advantageous to filter out higher order modes. In some embodiments, the first section of waveguide 205 operates as a higher order mode filter, i.e., it attenuates higher order modes at a higher rate than the fundamental mode. The curved section may allow optical power propagating in higher order modes to escape from the waveguide at significantly higher rates than the fundamental mode, so that if at one end of the first section of waveguide 205 light propagating in a first superposition of modes is launched into the waveguide of the first section of waveguide 205, then the light exiting the other end of the first section of waveguide 205 may carry a second superposition of modes, in which a greater proportion of the optical power is in the fundamental mode than in the first superposition of modes. In some embodiments, the first section of waveguide 205 may attenuate each higher order mode by at least 10 dB (e.g., by an attenuation between 10 dB and 100 dB) and it may attenuate the fundamental mode by as little as 0.02 dB (e.g., by between 0.02 dB and 2 dB).

In some embodiments, doped regions 130 (FIG. 1) may be formed in the device layer on both sides of the first section of waveguide 205 to absorb (e.g., by free carrier absorption) the light that escapes from the first section of waveguide 205 (as a result of the curvature of this section of waveguide), and that, if not absorbed, may interfere with the operation of other parts of the photonic integrated circuit. The doped regions 130 may have a doping density of (or within an order of magnitude of) $10^{19}/cm^3$ (with either an n-type dopant or a p-type dopant) and be positioned and sized so as to intercept most of the light that escapes from the first section of waveguide 205; the distribution of this light may be determined using a simulation. In some embodiments, each of two doped regions 130 used has the shape of a stripe about 3 microns wide running parallel to the first section of waveguide 205 and just inside a respective one of the two slabs (e.g., along the edge of the slab that is most distant from the rib waveguide 105).

Waveguides fabricated using photolithography or other fabrication techniques employed to fabricate photonic integrated circuits may have walls with small-scale (e.g., nm-scale) roughness. This roughness may result in each wall of the waveguide having a local curvature, on a small scale, that is relatively large and fluctuates significantly along the length of the waveguide. This local roughness, however, may have relatively little effect on the propagation of light in the waveguide. Accordingly, the curvature of a waveguide (as distinct from the local curvature of a wall of the waveguide) is defined herein as the curvature that would be measured if the small-scale roughness of the waveguide is disregarded. The curvature of a waveguide may be measured, for example, with an optical microscope, which may be insensitive to features (such as waveguide wall roughness) that are significantly smaller than the wavelength of visible light. As used herein, a "section" of waveguide is a length of waveguide; as such a first section of waveguide may in turn include a plurality of sections, each of which is a portion of the first section of waveguide, along the length of the first section of waveguide. As used herein, if a first section of waveguide is described as "abutting" a second section of waveguide, it means that the second section begins where the first section ends; there may or may not be a physical feature (e.g., a change in the rate of change of curvature) at the point at which the two sections abut against each other.

As used herein, the "normal" of a surface or plane is a vector perpendicular to the surface or plane. As used herein, the "centerline" of a waveguide is a line (e.g., a curved line) each point of which is, in a direction parallel to the plane of the photonic integrated circuit and transverse to the waveguide, in the middle of the waveguide.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. When a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a waveguide facet interface have been specifically described and illustrated herein, many modifications and variations will be apparent to those skilled in the art. Accordingly, it is to be understood that a waveguide facet interface constructed according to principles of this disclosure may be embodied other than as specifically described herein. The invention is also defined in the following claims, and equivalents thereof.

What is claimed is:

1. A photonic integrated circuit, comprising:
a waveguide; and
a waveguide facet,
a first end of the waveguide being at the waveguide facet,
a first angle being an angle between:
the waveguide at the first end of the waveguide, and
the normal to the waveguide facet,
the first angle being at least 5 degrees,
a first section of the waveguide having a first end at the waveguide facet and a second end,
the first section having:
a curvature of less than 0.01/mm at the first end of the first section,
a curvature of less than 0.01/mm at the second end of the first section, and
a curvature of at least 0.1/mm at a point between the first end and the second end,
wherein the maximum value of the magnitude of the rate of change of curvature within the first section is less than 15/mm$^2$.

2. The photonic integrated circuit of claim 1, further comprising a dicing edge, wherein a second angle is an angle between the waveguide facet and the dicing edge, the second angle being greater than 20 degrees.

3. The photonic integrated circuit of claim 2, wherein the second angle is within 2 degrees of the inverse sine of 3.5 times the sine of the first angle.

4. The photonic integrated circuit of claim 1, wherein the first angle is less than 13 degrees.

5. The photonic integrated circuit of claim 1, wherein the length of the first section is less than 4 mm.

6. The photonic integrated circuit of claim 5, wherein the first section has a curvature of at least 0.2/mm at a point between the first end and the second end.

7. The photonic integrated circuit of claim 5, wherein the first section attenuates a fundamental transverse mode by less than 0.1 dB.

8. The photonic integrated circuit of claim 5, wherein the first section attenuates a higher order transverse mode by at least 3 dB.

9. The photonic integrated circuit of claim 5, comprising a doped region on one side of the first section.

10. The photonic integrated circuit of claim 5, wherein the length of the first section is less than 2 mm.

11. The photonic integrated circuit of claim 10, wherein the first section has a curvature of at least 0.3/mm at a point between the first end and the second end.

12. The photonic integrated circuit of claim 10, wherein the first section attenuates a fundamental transverse mode by less than 0.1 dB.

13. A photonic integrated circuit, comprising:
a waveguide; and
a waveguide facet,
a first end of the waveguide being at the waveguide facet,
a first angle being an angle between:
the waveguide at the first end of the waveguide, and
the normal to the waveguide facet,
the first angle being at least 5 degrees,
a first section of the waveguide having a first end at the waveguide facet and a second end,
the first section having:
a curvature of less than 0.01/mm at the first end of the first section,
a curvature of less than 0.01/mm at the second end of the first section, and
a curvature of at least 0.1/mm at a point between the first end and the second end,
wherein:
the first section comprises:
a second section of waveguide having a first end and a second end, and
a third section of waveguide, having a first end abutting against the second end of the second section, and a second end;
the curvature at the second end of the second section of waveguide is at least 0.1/mm;
the curvature at the first end of the third section of waveguide is at least 0.1/mm; and
the rate of change of curvature is, everywhere within the second section or everywhere within the third section, within 20% of a constant.

14. The photonic integrated circuit of claim 13, wherein the rate of change of curvature is, everywhere within the second section, within 20% of a constant.

15. The photonic integrated circuit of claim 13, wherein the rate of change of curvature is, everywhere within the third section, within 20% of a constant.

16. A photonic integrated circuit, comprising:
a waveguide; and
a waveguide facet,
a first end of the waveguide being at the waveguide facet,
a first angle being an angle between:
the waveguide at the first end of the waveguide, and
the normal to the waveguide facet,
the first angle being at least 5 degrees,
a first section of the waveguide having a first end at the waveguide facet and a second end,
the first section having:
a curvature of less than 0.01/mm at the first end of the first section,
a curvature of less than 0.01/mm at the second end of the first section, and
a curvature of at least 0.1/mm at a point between the first end and the second end,
wherein:
the first section comprises:
a second section of waveguide having a first end and a second end, and
a third section of waveguide, having a first end abutting against the second end of the second section, and a second end;
the curvature at the second end of the second section of waveguide is at least 0.1/mm;
the curvature at the first end of the third section of waveguide is at least 0.1/mm; and
each point of a centerline of the second section is within 5 microns of a curve defined by a set of points, each point having, for a value of a parameter L:
an x coordinate equal to a product of a constant of proportionality and the integral, over a first variable of integration ranging from zero to L, of the cosine of the square of the first variable of integration, and
a y coordinate equal to a product of the constant of proportionality and the integral, over a second variable of integration ranging from zero to L, of the sine of the square of the second variable of integration.

17. A photonic integrated circuit, comprising:
a waveguide; and
a waveguide facet,
a first end of the waveguide being at the waveguide facet,
a first angle being an angle between:
the waveguide at the first end of the waveguide, and
the normal to the waveguide facet,
the first angle being at least 5 degrees,
a first section of the waveguide having a first end at the waveguide facet and a second end,
the first section having:
a curvature of less than 0.01/mm at the first end of the first section,
a curvature of less than 0.01/mm at the second end of the first section, and
a curvature of at least 0.1/mm at a point between the first end and the second end,
wherein the first section attenuates a fundamental transverse mode by less than 0.1 dB, and
wherein the length of the first section is less than 4 mm.

18. A photonic integrated circuit, comprising:
a waveguide; and
a waveguide facet,
a first end of the waveguide being at the waveguide facet,
a first angle being an angle between:
the waveguide at the first end of the waveguide, and
the normal to the waveguide facet,
the first angle being at least 5 degrees,
a first section of the waveguide having a first end at the waveguide facet and a second end,
the first section having:
a curvature of less than 0.01/mm at the first end of the first section,
a curvature of less than 0.01/mm at the second end of the first section, and
a curvature of at least 0.1/mm at a point between the first end and the second end,
wherein the photonic integrated circuit comprises a doped region on one side of the first section.

19. The photonic integrated circuit of claim 18, wherein the length of the first section is less than 4 mm.

\* \* \* \* \*